(12) United States Patent
Wulff et al.

(10) Patent No.: US 7,191,146 B2
(45) Date of Patent: Mar. 13, 2007

(54) PRINTING AND DELIVERY OF DIGITAL IMAGES AND MERGED INFORMATION FROM A CENTRAL RECEIVING AGENCY

(75) Inventors: Thomas R. Wulff, Churchville, NY (US); David L. Patton, Webster, NY (US); Gustavo R. Paz-Pujalt, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 515 days.

(21) Appl. No.: 10/032,684

(22) Filed: Oct. 22, 2001

(65) Prior Publication Data

US 2004/0215523 A1    Oct. 28, 2004

(51) Int. Cl.
*G06Q 30/00* (2006.01)
(52) U.S. Cl. ...................................................... 705/26
(58) Field of Classification Search .................. 705/26, 705/14; 704/26
See application file for complete search history.

(56) References Cited

U.S. PATENT DOCUMENTS

| | | | |
|---|---|---|---|
| 4,872,706 A | 10/1989 | Brewen et al. | |
| 5,423,573 A | 6/1995 | dePassille | |
| 5,666,215 A * | 9/1997 | Fredlund et al. | ............ 358/487 |
| 6,018,774 A | 1/2000 | Mayle et al. | |
| 6,718,551 B1 * | 4/2004 | Swix et al. | ................... 725/32 |
| 6,732,152 B2 * | 5/2004 | Lockhart et al. | ............ 709/206 |

FOREIGN PATENT DOCUMENTS

EP        1126394 A1 *  8/2001

OTHER PUBLICATIONS

Stephens, Mug Shots Stamps from Australia Post, copyrighted in 1999, downloaded from the Internet on Dec. 10, 2004, 5 pages.*

* cited by examiner

*Primary Examiner*—Jaime E. Zurita
(74) *Attorney, Agent, or Firm*—Raymond L. Owens

(57) ABSTRACT

A method of delivering printed images to a recipient, includes the steps of electronically transmitting digital images and image locator information from a location remote from and over a communication channel to a central receiving agency which stores such images and locator information in memory; and identifying a particular stored image in the memory using the corresponding image locator information and the location of one or more recipients and printing locations corresponding to each of the recipients. The method further includes transmitting the identified particular stored image in the memory to the printing location of each of the recipients; and printing the image at the printing location of each of the recipients and delivering the printed image in a package to the location corresponding to of each of the recipients.

8 Claims, 12 Drawing Sheets

PRINTING AND DELIVERY OF DIGITAL IMAGES AND MERGED INFORMATION FROM A CENTRAL RECEIVING AGENCY

CROSS REFERENCE TO RELATED APPLICATIONS

Reference is made to commonly assigned U.S. patent application Ser. No. 09/359,152 filed Jul. 22, 1999, entitled "Authorizing the Printing of Digital Images", by David L. Patton et al and U.S. patent application Ser. No. 09/378,159 filed Aug. 19, 1999, entitled "System for Customizing and Ordering Personalized Postage Stamps" by David L. Patton et al, and U.S. patent application Ser. No. 09/416,697, filed Oct. 12, 1999, entitled "Printing and Delivery of Digital Images and Text Via a Central Receiving Agency" by Paz-Pujalt et al, the disclosures of which are incorporated herein.

FIELD OF THE INVENTION

This invention relates to a central receiving agency merging digital images from a consumer and from a sponsor and delivering such merged images to recipient(s).

BACKGROUND OF THE INVENTION

U.S. Pat. No. 6,018,774 discloses a method for creating an electronic postcard delivered electronically to the recipient. A system interacts with a user to create and configure a display. A user provides the image data to the system and optionally specifies a message and address for the image display. The system creates the display, comprising a mixture of image and textual data, and sends a notification including identification of the display to a specified addressee. The addressee can then request receipt of the display from the system via the identification information sent by the system.

Commonly-assigned U.S. Pat. No. 5,666,215 discloses a method for viewing photographic images on a personal computer and enabling a consumer to select images for initial printing, reprinting and ordering related image products.

Photographic negatives often are provided to a scanner to obtain image data. The image data is manipulated to provide a positive image in the case of the photographic negatives and sent to the consumer's personal computer. The desired images are then selected and order information is provided, based on the positive image as displayed on the display of the personal computer. The order information is recorded to permit the desired prints and services to be created and the resulting order is sent to the location. The following can also be used as sources of images to be selected for prints and other services; image files from digital cameras, image files stored in digital format on floppy disks, Picture CDs, Photo CDs, CD-ROMs, downloaded from the Internet, and negatives and prints scanned using a scanner and displayed on a personal computer's display.

The above discussed patents describe methods and systems by which a consumer can create or receive digital files of their images. Also described are how consumers can send these image files to a central receiving agency with the consumer authorization code 250 for these image files to be printed and various types of hardcopy products to be created.

These same consumers frequently use their personal computers to send images attached to e-mail messages to friends and relatives that also own personal computers that are connected to electronic communications systems such as the Internet. A problem is a majority of the consumers do not own or have access to personal computers or have ready access to the Internet. Therefore they do not have the capability to receive images electronically from friends and relatives who do. In some cases where consumers have Internet access at their place of employment they do not have the ability to print a color high quality image from the image file they receive. In addition many recipients prefer hard copy over soft copy displays.

Furthermore in some cases an advertiser or sponsors may wish to use the soft display (Cathode ray tube, liquid crystal display) to show a message that they wish the consumer to see and share with a receiver as in the case of targeted advertising or fund raising activities.

U.S. Pat. No. 4,872,706 discloses a method for providing a postage ad label. A label having an advertisement for a specific company and a space for a postage stamp is affixed to an envelope and the cost of the postage is reduced by the revenue from the ad label.

U.S. Pat. No. 5,423,573 discloses a device where a composite stamp has two parts that are used in combination to provide the finished stamp on a piece of mail. One part bears a decorative design, and the second part bears the normal identifying postage-related information including country, denomination, etc. and also has an area on which the first part is to be adhered. Both parts have adhesive backs and may, for example, be provided in dry-peelable form on a suitable carrier substrate.

There is a problem with prior arrangements in that they both require extra handling and processing. The above two patents describe methods for sponsoring mail.

SUMMARY OF THE INVENTION

It is an object of the present invention to provide a method of delivering and printing images from digital image files for a recipient where there is reduced physical handling of the package and the number of required devices.

This object is achieved in a method of printing and delivering images from digital image files for one or more recipients, comprising the steps of:

a) a consumer electronically transmitting digital images, demographic information identifying the consumer or recipient, from a location remote from and over a communication channel to a central receiving agency which stores such images and locator information in memory and provides such locator information to the consumer;

b) a sponsor electronically transmitting at least one sponsor digital image and demographic requirements identifying consumers and recipients and specifying at least some of the sponsor digital image(s) which based upon correlation between the demographic information and the demographic requirements to identify at least some of the sponsored digital image(s), from a location remote from and over a communication channel to a central receiving agency which stores such images and locator information in memory and provides such locator information to the sponsor;

c) the consumer identifying a particular stored image in the memory using the corresponding image locator information and the location of one or more recipients;

d) merging into a digital file the consumer identified digital image and the corresponding sponsor digital images;

e) transmitting the corresponding merged digital file for the identified particular stored image in the memory and display such image and the merged information to the printing location of the consumer or identified recipient(s);

f) printing the merged image at the printing location corresponding to consumer identified recipient(s) and delivering the printed merged image in a package to the location corresponding to the recipient(s); and g) the sponsor making at least partial payment to the central receiving agency for the printing and delivering the merged digital file.

It is a feature of the present invention that by electronically merging consumer and sponsor images and information there is a substantial reduction in the physical handling and required devices.

It is a feature of the present invention that the printed images can have text, graphic, audio or video information.

It is a another feature of the present invention that the printed images can have text, graphic, audio or video information included as part of the final package.

It is another feature of the present invention that images and merged information can be conveniently sent to recipients and the cost of such process is paid at least in part by the sponsor of the merged digital image file.

DETAILED DESCRIPTION OF THE PREFERRED EMBODIMENT

Figure 1A:
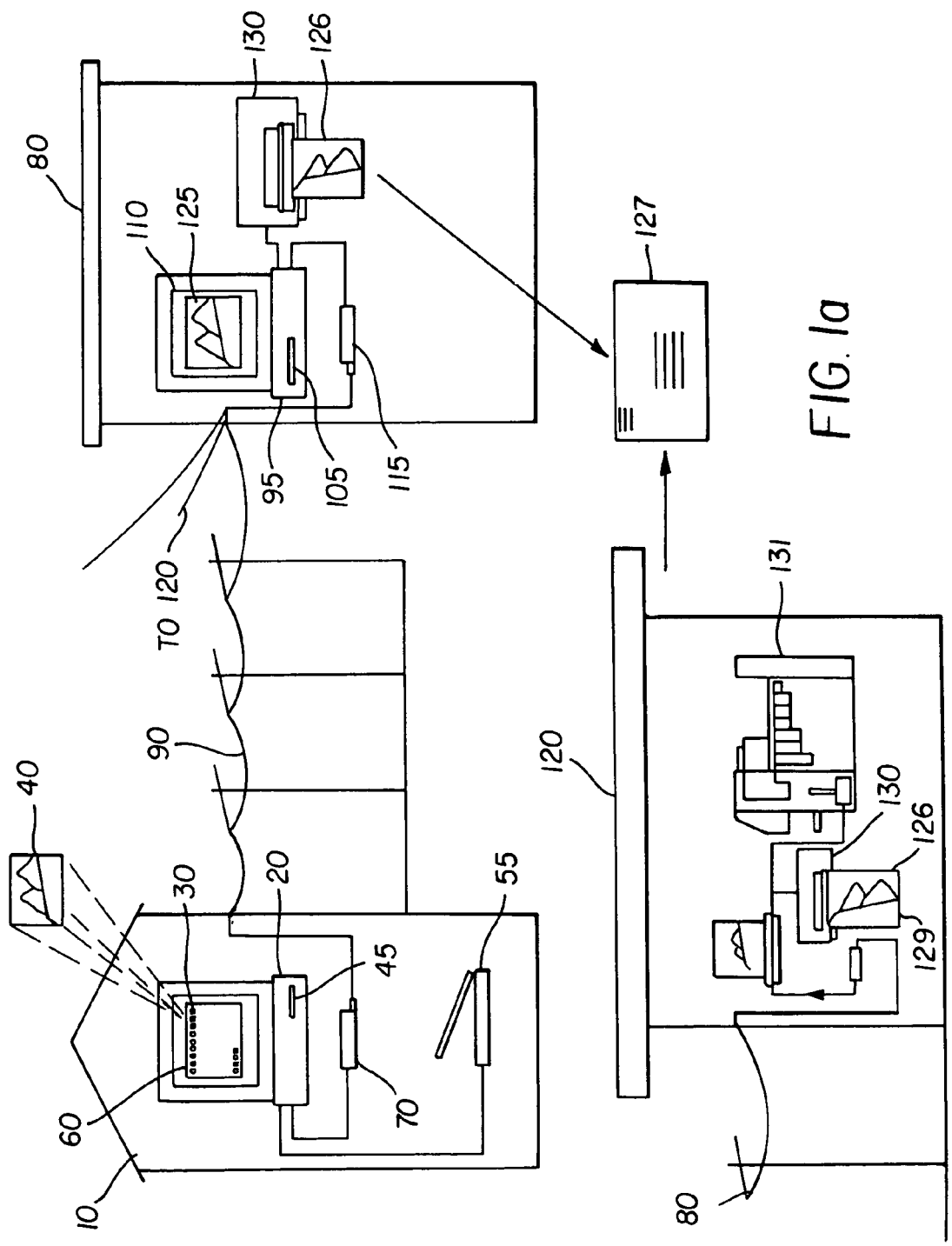
FIG. 1a illustrates a system for the consumer communicating with the central receiving agency and the printing of the merged digital file at a remote location.

Referring now to FIG. 1a, there is illustrated a system for delivering and printing consumer and sponsor images from digital image files for a recipient which permits at least partial payment by the sponsor for such delivery. In addition digital audio and digital video may also be sent to the recipients and printed where printing and/or written includes writing to a CD-ROM, writeable CD, DVD, writeable DVD, digital optical tape or other appropriate media. More particularly a set of personal images 30 is viewed at a remote location 10 on a personal computer 20 or interactive TV (not shown) or any Internet-capable appliance or device (not shown). The source of the personal images 30 can be image files stored in digital format on floppy and hard disks, Picture CDs, Photo CDs, CD-ROMs and DVDs. The image files can also be downloaded from the Internet using a system such as Kodak's PhotoNet, or negatives and prints can be scanned using the consumer's own film scanner 45 or print scanner 55 and displayed on their personal computer's monitor 60. A consumer selected image(s) 40 is selected, and text, image locator information, the location of the recipient and consumer demographics are added by the consumer and are electronically transmitted as signals from the remote location 10 over a communication channel 90 to the central receiving agency 80 where the information is received and stored in memory 105. The transmitted consumer information includes, but not limited to, the consumer's location, credit card number, consumer authorization, image locator information and number of prints, text and graphics to be printed and delivered to the location of one or more recipients, and consumer demographics include such things as age, ethnicity, income, or other information. The consumer has the option of designating the size and quality level at which the prints are to be made and the type of media to be used to produce the printed image or the type of media the video, digital video, audio, and/or digital audio are to be written. The consumer may also modify the image by adding text, graphics, and etc. The media can typically be paper, but can be as diverse as ceramic or plastic mugs or cloth or polymeric materials. The images can be included in a digital file. The digital file also includes image locator information. The image locator information can be a name associated with the digital image. The image locator information can be used by a central receiving agency 80 to sort image into a particular location for retrieval.

The digital file including the locator of the consumer selected image(s) 40 and the consumer information are sent via a modem 70 to the central receiving agency 80 such as the U.S. Postal Service over the communication channel 90, such as the Internet. The central receiving agency 80 receives the image file and/or image locator information and consumer information via a modem 115, and using a central server 95 records, and stores the image file and/or image locator information and consumer information and consumer demographics in memory 105. Sponsor images can be included in a digital file. The digital file also includes image locator information. The image locator information can be a name associated with the digital image. This name can be used by a central receiving agency 80 to sort the image file in a particular location for retrieval.

Figure 1B:
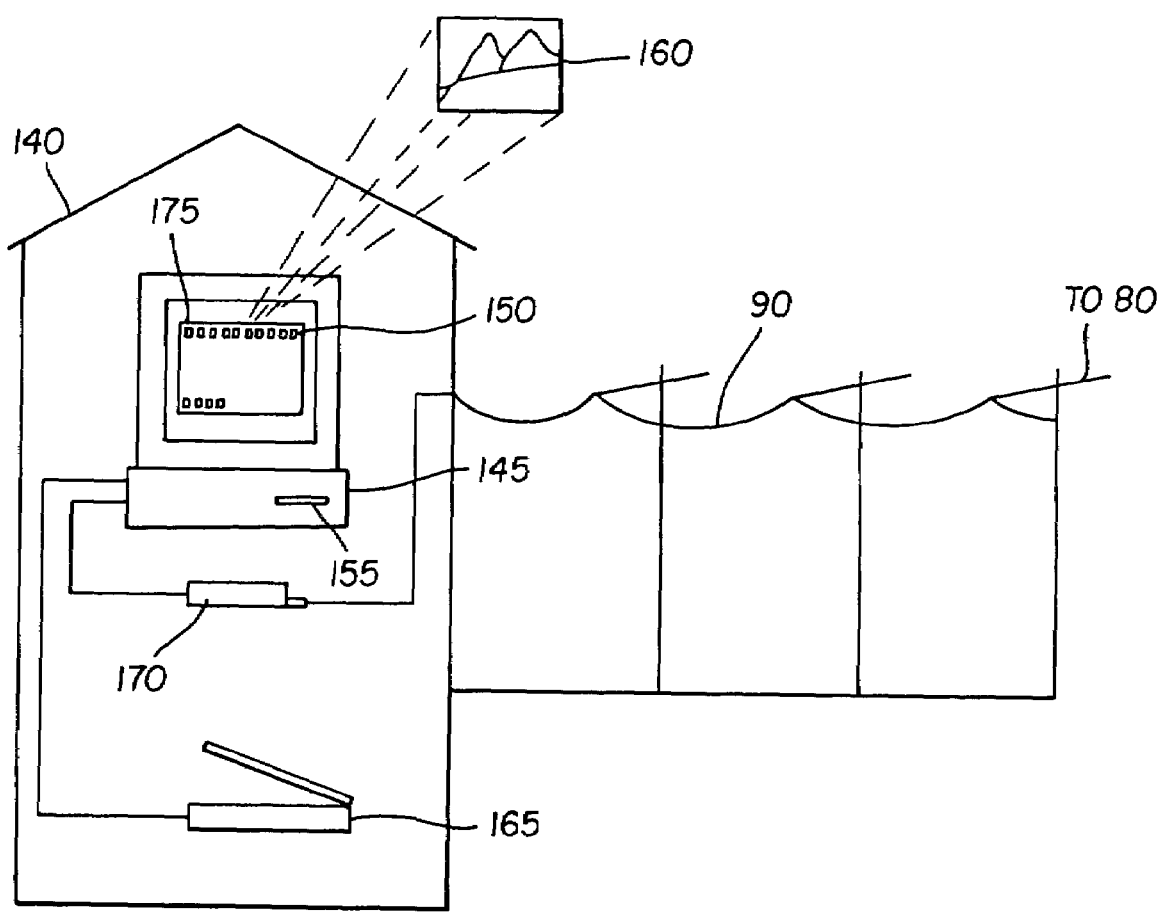
FIG. 1b illustrates a system for the sponsor communicating with the central receiving agency.

Referring to FIG. 1b a set of sponsor digital image(s) 150 is viewed at a remote sponsor location 140 on a personal or commercial sponsor computer 145 or interactive TV (not shown) or any Internet-capable appliance or device (not shown). The source of the sponsor digital image(s) 150 can be image files stored in digital format on floppy and hard disks, Picture CDs, Photo CDs, CD-ROMs and DVDs. The image files can also be down loaded from the Internet using a system such as Kodak's PhotoNet, or negatives and prints can be scanned using the sponsor's own film scanner 155 or print scanner 165 and displayed on their personal computer's monitor 175. The sponsor selects a sponsor image(s) 160, adds text, graphics, image locator information and the location of the recipient and sponsor requirements and electronically transmits these files as signals from the remote sponsor location 140 over a communication channel 90 to the central receiving agency 80 where the information is received and stored in memory 105. The transmitted sponsor information includes, but not limited to, the sponsor's location, billing account, sponsor authorization, image locator information, text and graphics to be merged on digital images printed and delivered to the location of one or more consumer designated recipients. The sponsor requirements may include the demographics such as age range, ethnicity, income range and/or other information, which the sponsor may use to designate the specific type of information to be sent to a consumer and/or recipient who has those specific demographics.

Referring again to FIG. 1b, the digital file, including the locator of the sponsor selected image(s) 160. The sponsor requirements are sent via a modem 170 or other communication devices to the central receiving agency 80 such as the U.S. Postal Service over the communication channel 90, such as the Internet. The central receiving agency 80 receives the image file and/or image locator information. Consumer, recipient, and sponsor information are also sent via a modem 115 or other communication devices, and using a central server 95 records, and stores the image file and/or image locator information, audio file and/or video file, recipient location and sponsor requirements in memory 105. The central receiving agency 80 views the consumer selected image(s) 40 and consumer information on a monitor 110 and identifies and authorizes the printing of a modified image 125 with text and graphics at the central receiving agency 80 or at a particular local printing station 120. The consumer causes the electronic transmission of the digital images and locator information from a location remote from and over the communication channel 90 such as telephone lines into a memory location in the central receiving agency 80. The consumer can simultaneously at this time cause a stored image in memory, using the corresponding image locator information and the location of one or more recipients, to transmit these data to the printing location for each of the recipients. The images are printed at these locations and then delivered by mail or courier to each of the recipients. The identifying step can be simultaneously with or at a later time than the electronic transmitting step. The consumer in addition to printed images can designate digital audio and digital video written to CDs etc. to be sent to the recipients.

After receiving the image file including image locator information at the central receiving agency 80, from both the consumer and the sponsor, either consumer selected image (s) 40 or sponsor selected image(s) 160 can be modified in such a way that the image is different from the original and the results are stored in memory 105 for future use. For example, but not by way of limitation, text or graphics may be added, or the color of the image, or a portion thereof, may be adjusted by cropping, enlarging or repositioning. The resulting modified image 125 is then stored in memory 105 and its location identified for future use. It will be understood by those skilled in the art that the image file before delivery to the central receiving agency can include text or graphics or other image modifications. The text or graphics can be printed on or with the image. Sponsors are selected based on sponsor requirements, central receiving agency requirements, consumer demographics and extracted recipient demographics. Sponsors are then billed according to the selection process. For example, a sponsor may require that the sponsor selected image(s) 160 be merged only with consumers and/or recipients whose age is between 35 and 50. This requirement is then tested against the consumer age demographic information 240. If the age of the consumer is for example 36, then the sponsor's image will be merged with the consumer's image. If, for example, the consumer's age is 75, other sponsors' requirements will be examined until an appropriate sponsor is determined.

The central receiving agency 80 transmits the consumer image 125 and sponsor information to a local printing station 120, which corresponds to one or more recipients designated by the consumer. The recipients can be listed on a distribution list provided by the consumer's personal computer 20 at the remote location 10. After the central receiving agency 80 has determine that a consumer is authorized to transmit images to one or more recipients, such images 125 and sponsor selected image(s) 160 and information are transmitted to each local printing station 120 for printing and delivery to the one or more recipients.

A hardcopy 126 of the image 125 as modified including text and/or graphics 129 is now printed at each local printing station 120. A hardcopy 126 of the modified image 125 and text and/or graphics 129 are included in a package 127 and delivered to each designated recipient. At the designated local printing station 120, the hardcopy 126 of the image and text and/or graphics 129 are included in a package 127 and delivered to the location of the recipient via the mail or a courier service such as the U.S. Postal Service, Federal Express or DHL. Because the consumer has the option of designating the size and quality of the hardcopy 126 and the media type, a variety of digital printer choices are necessary. The hardcopy 126 of the image and text and/or graphics 129 can be printed using a thermal printer 130 such as a KODAK PS 8650 Color Printer or a KODAK Photo Printer 4700 or a minilab 131. Other types of digital printers such as a KODAK CRT Digital Color Printer, a Hewlett Packard Deskjet 870Cix Inkjet Printer, or a digital electrophotographic printer such as an Indigo-E-1000 can be used to produce the hardcopy 126. The consumer can also designate digital audio and digital video written to CDs etc. be part of the package 127 and delivered to the recipient or recipients. The package 127 includes all consumer and designated sponsor image(s), audio files, video files, recipient address and consumer address.

Figure 2:
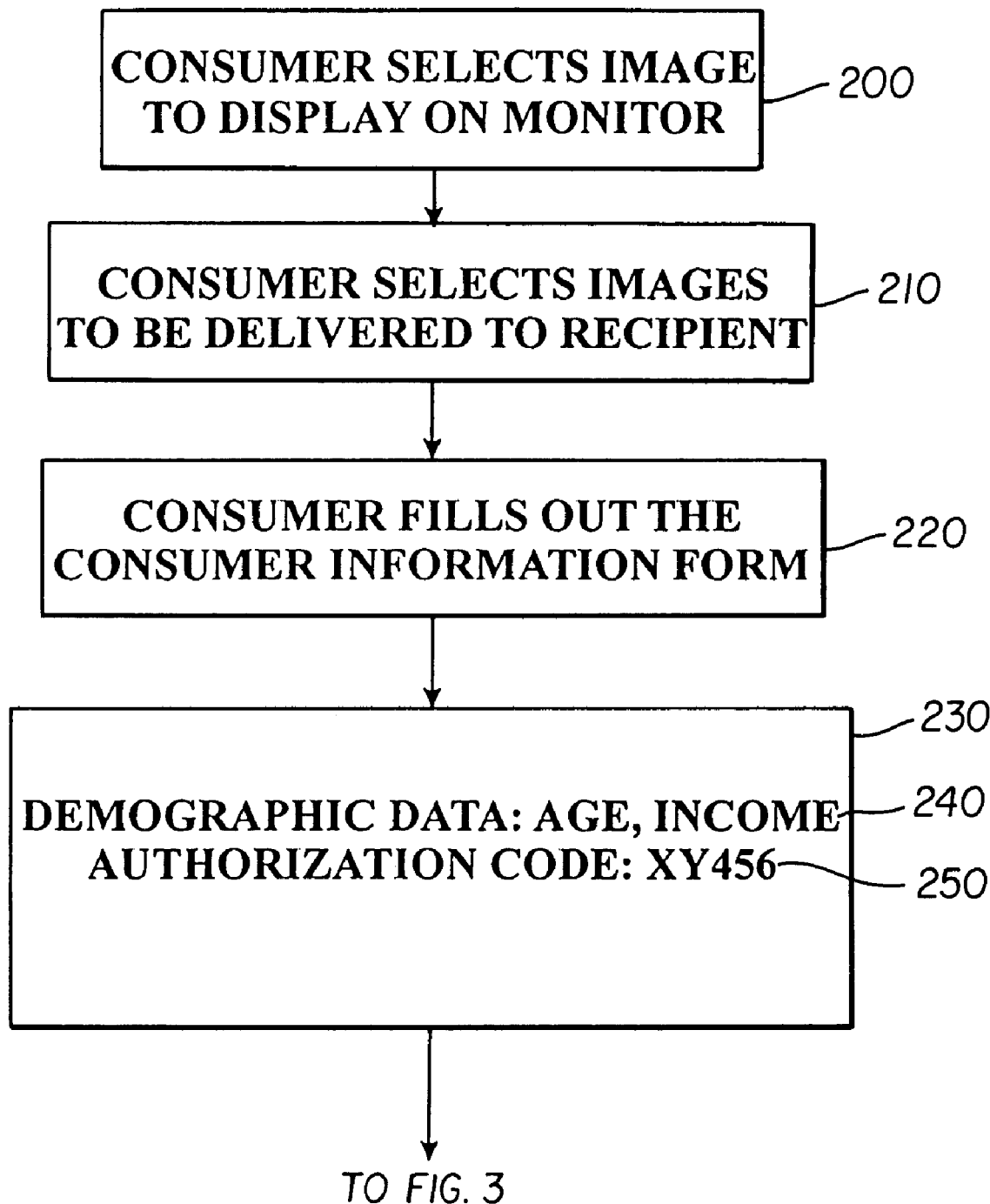
FIG. 2 is a flow chart that illustrates the process whereby a consumer selects a digital image and provides demographic information illustrating the method for printing and delivering images from digital image files for a recipient which permits at least partial payment for such delivery.

Now referring to FIG. 2 there is provided a flow chart showing how a consumer selects an image and; an image locator in preparation for transmitting them over a communication channel to the central receiving agency. Images are defined for this document as traditional digital images, video, audio or any combination thereof. The consumer selects the images from their image files to be viewed 200 on a monitor 60. The consumer selects 210 the consumer selected image(s) 40 to be delivered to the recipient from the images displayed on the computer monitor 60. The consumer then fills out 220 the consumer information form 230. The consumer information form 230 contains but is not limited to the consumer's address, credit card number, graphics locator, consumer authorization code 250 and demographic data 250. The consumer authorization code 250 can be linked to the consumer's credit card number similarly to the way a pin number is linked to a credit card and is well known in the art. The linking of the consumer authorization code 250 to the consumer's credit card number can be done for added security but is not necessary. The central receiving agency 80 can use the consumer authorization code 250 as a customer order number. The central receiving agency 80 can also use the consumer authorization code 520 to inform the consumer that the consumer selected image(s) 40 was approved and sent to the designated recipient.

Figure 3:
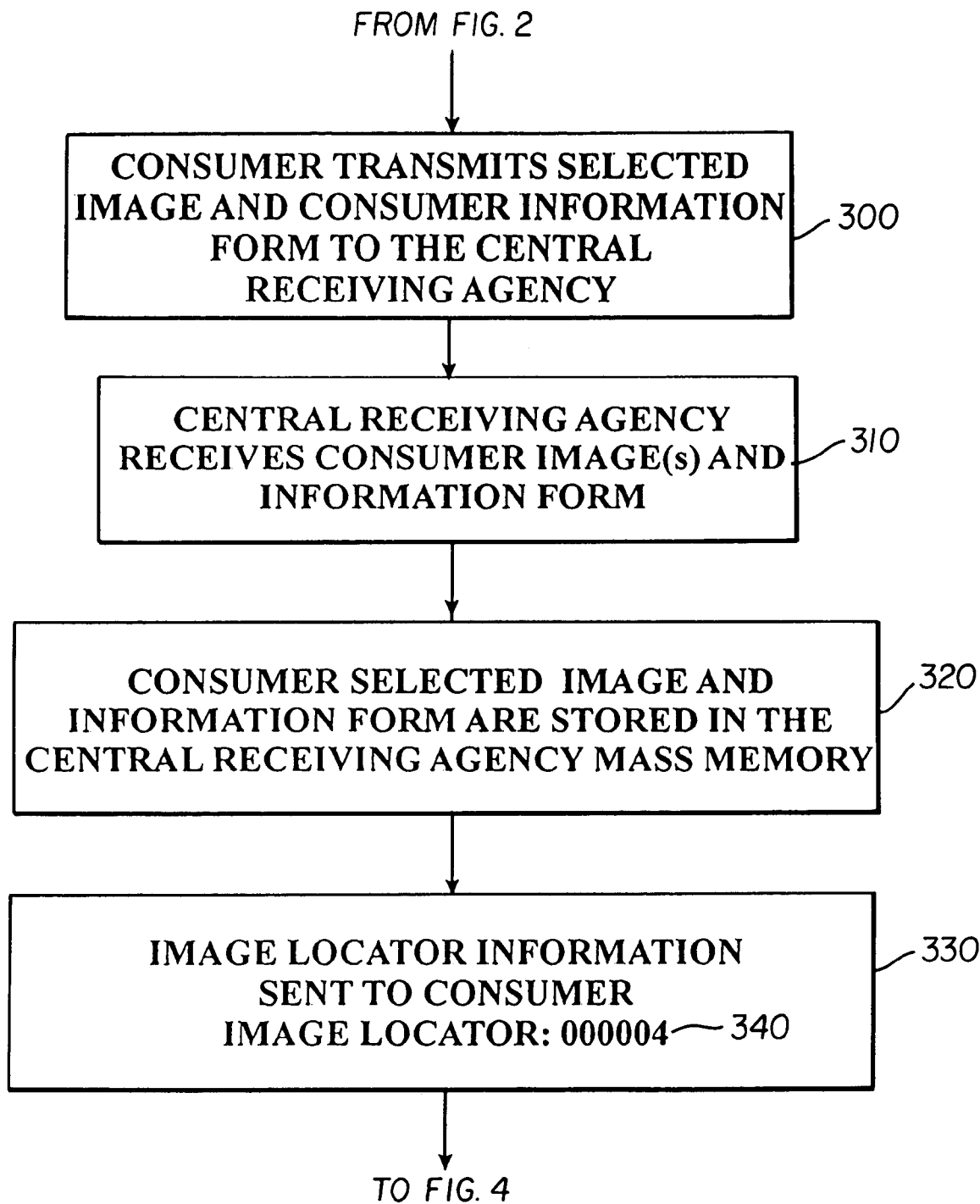
FIG. 3 is a flow chart continuing the flow chart of FIG. 2.

Now referring to FIG. 3, which flows from FIG. 2, the consumer electronically transmits 300 the selected digital image and consumer information form 230 from the remote location 10 over the communication channel 90 to the central receiving agency 80 which receives 310 and stores 320 such consumer selected images(s) 40 and information form in memory 105. The transmitting and identification steps may be performed simultaneously. The central receiving agency 80 receives 310 consumer information form 230. The central receiving agency generates a consumer image locator 340. The consumer image locator 340 is sent to the consumer 330 to allow the consumer future reference to the consumer selected image(s) 40 stored in memory 105.

Figure 4:
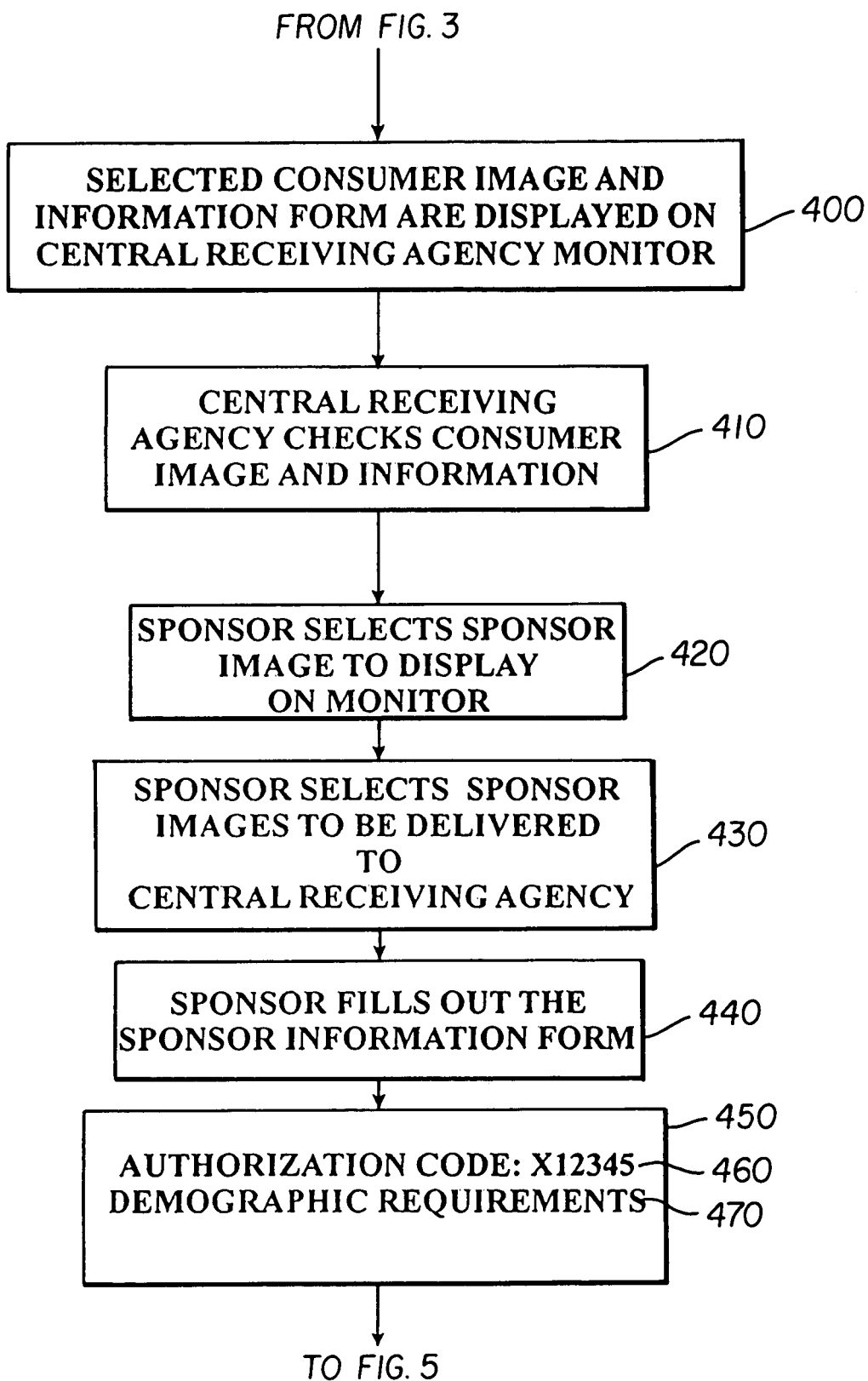
FIG. 4 is a flow chart continuing the flow chart of FIG. 3.

Now referring to FIG. 4, which flows from FIG. 3, the selected consumer selected image(s) 40 and information form 230 are displayed 400 on the central receiving agency monitor 110. The central receiving agency then checks 410 the consumer image 125 and information. The sponsor selects 420 sponsor digital image(s) 150 to be displayed on the computer monitor 175. The sponsor digital image(s) may include advertising information. The sponsor selects the sponsor selected image(s) 160 to be delivered to the central receiving agency 80 from the images displayed on the computer monitor 175. The sponsor then fills out 440 the sponsor information form 450. The consumer information form 450 contains but is not limited to the sponsor's address, billing information, graphics locator, sponsor authorization code 460 and demographic requirements 470.

Figure 5:
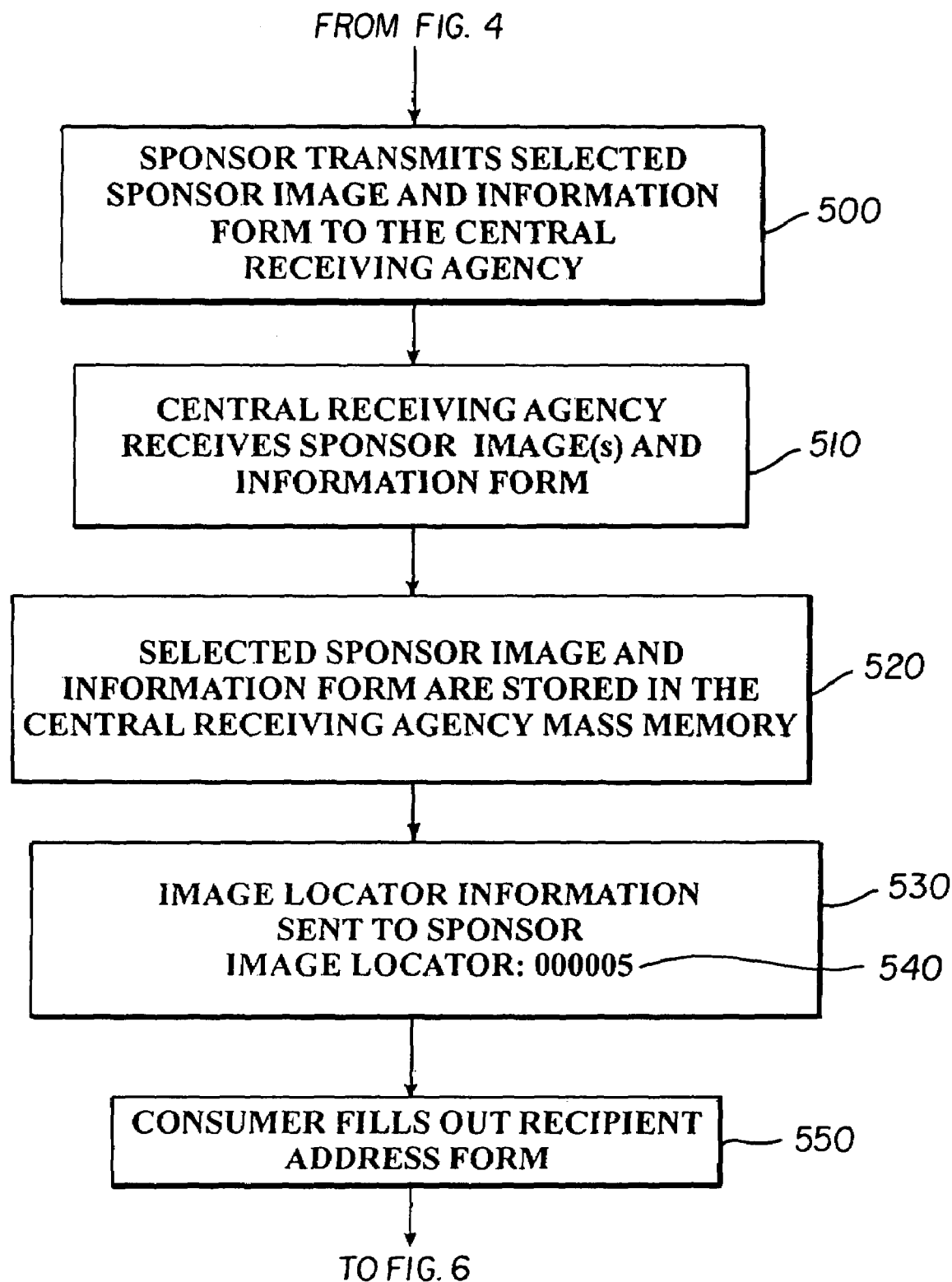
FIG. 5 is a flow chart continuing the flow chart of FIG. 4.

Now referring to FIG. 5, which flows from FIG. 4, the sponsor electronically transmits 500 the selected sponsor digital image and information form 450 from the remote sponsor location 140 over the communication channel 90 to the central receiving agency 80 which stores such sponsor selected image(s) 160 and information form 450 in memory 105. The transmitting and identification steps may be performed simultaneously. The central receiving agency 80 receives 510 sponsor information form 450 and the selected sponsor digital image(s) 150 and information are stored 520 in the central receiving agency's 80 memory 105. The central receiving agency generates a sponsor image locator 540. The sponsor image locator 540 is sent to the sponsor 530 to allow the sponsor future reference to the sponsor selected image(s) 160 stored in memory 105. The consumer fills out- 550 the recipient address form 610.

Figure 6:
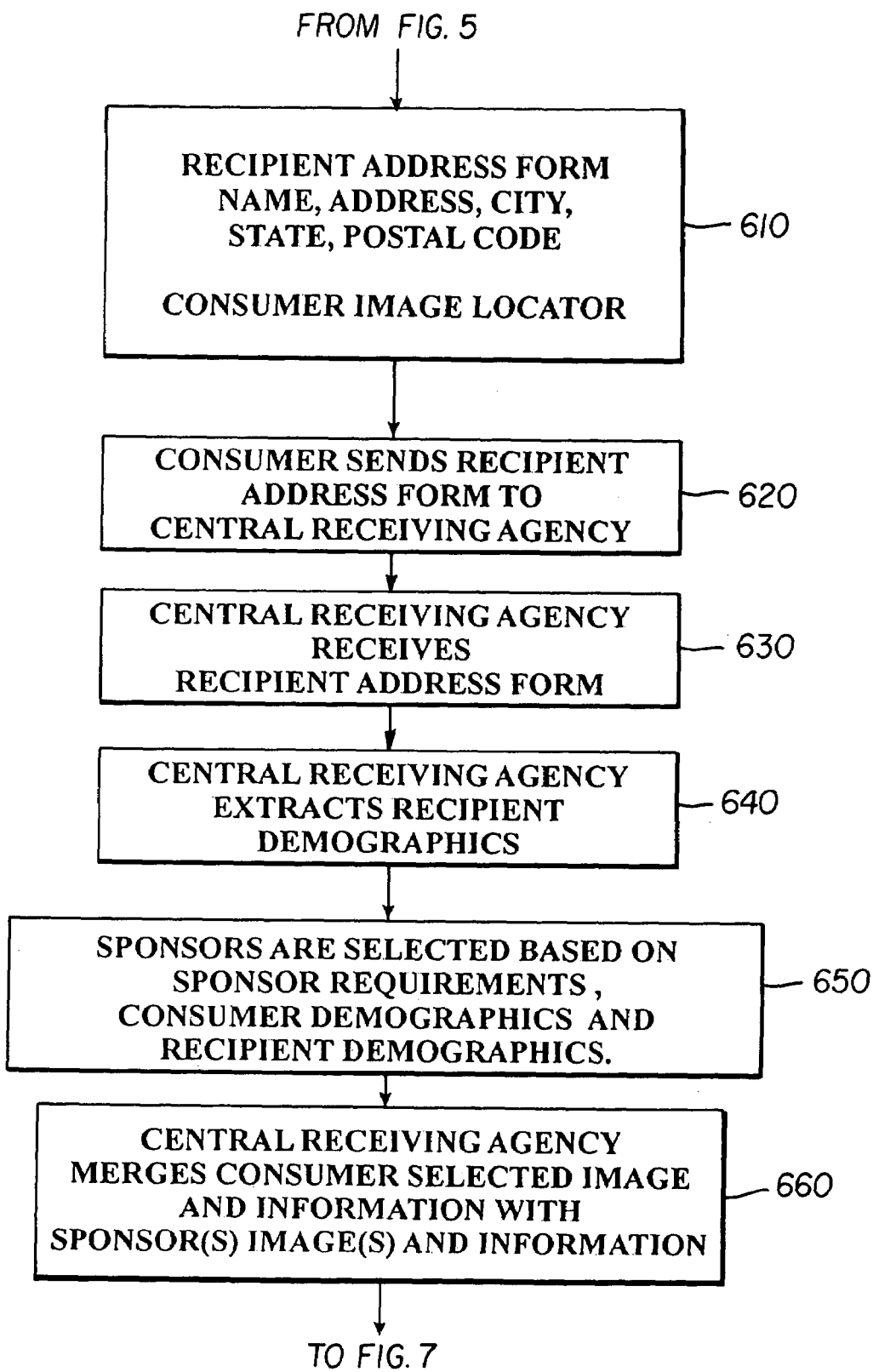
FIG. 6 is a flow chart continuing the flow chart of FIG. 5.

Now referring FIG. 6, which flows from FIG. 5, the recipient address form 610 is sent 620 to the central receiving agency 80. The central receiving agency 80 receives 630 the recipient address form 610. The central receiving agency 80 extracts 640 the recipient(s) demographic information from the corresponding recipient address and correlating recipient demographic information to permit particularizing of information included in the package sent to one or more recipients. Sponsors are selected 650 by the central receiving agency 80 based on sponsor requirements, consumer demographics and recipient demographics. The central receiving agency 80 then merges 660 the consumer selected image and information with sponsor(s) images(s) and information into a digital file. The selected sponsor(s) pays part of the cost of the service provided by the central receiving agency 80 and the local printing station 120.

Figure 7:
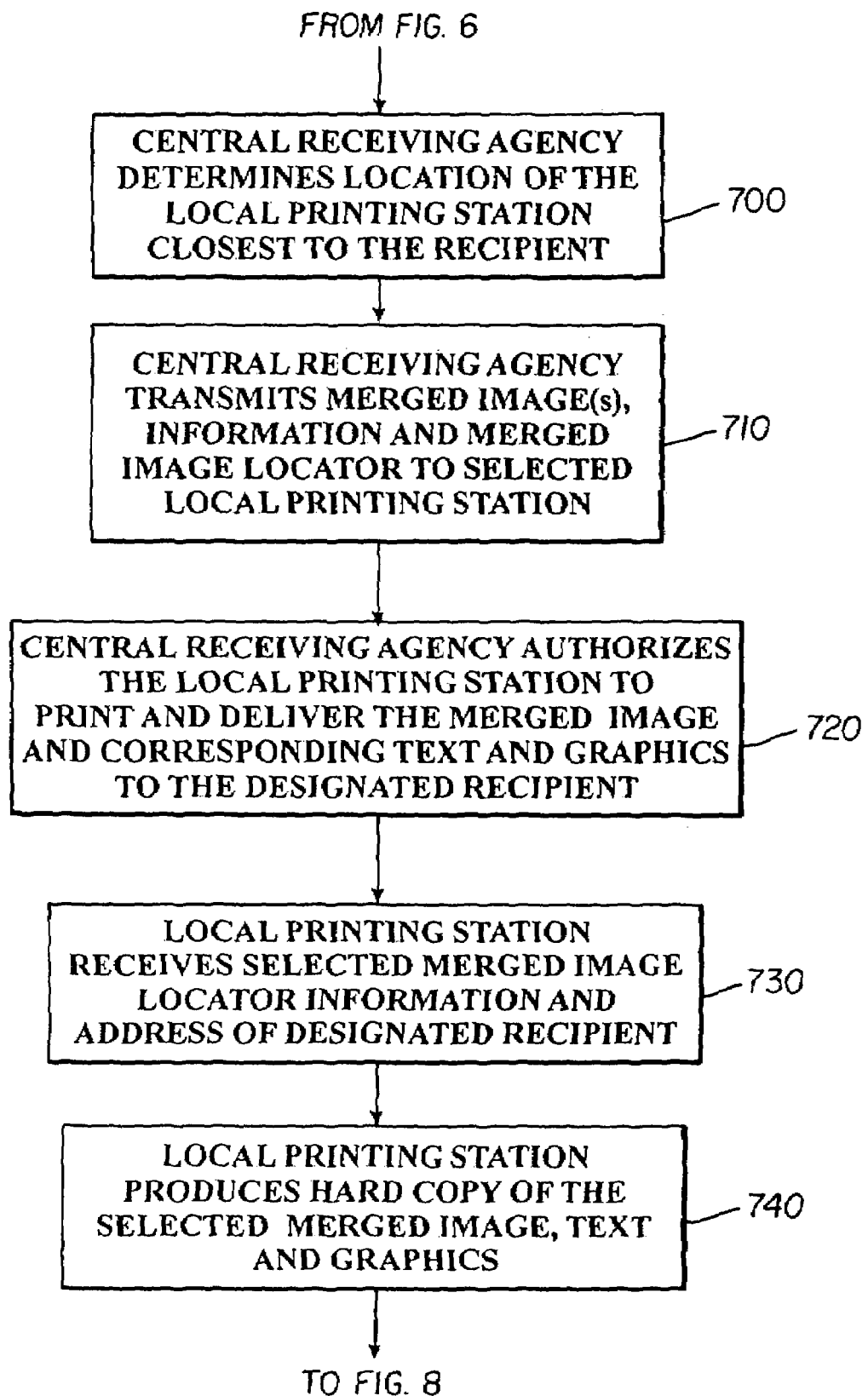
FIG. 7 is a flow chart continuing the flow chart of FIG. 6.

Now referring FIG. 7, flows from FIG. 6, the central receiving agency 80 determines 700 the location of the local printing station 120 closest to the designated recipient. The central receiving agency 80 transmits 710 the corresponding merged digital file and identified consumer image 125 in memory 105 to the local printing station 120 of each of the recipients and authorizes the local printing station 120 of each of the recipients and authorizes 720 the local printing station 120 to print or write to CDs and etc. the selected consumer image 125 merged with the selected sponsor image(s) 160 and text and/or graphics 129 and deliver the package 127 containing the hardcopy 126 to the designated recipient.

Figure 8:
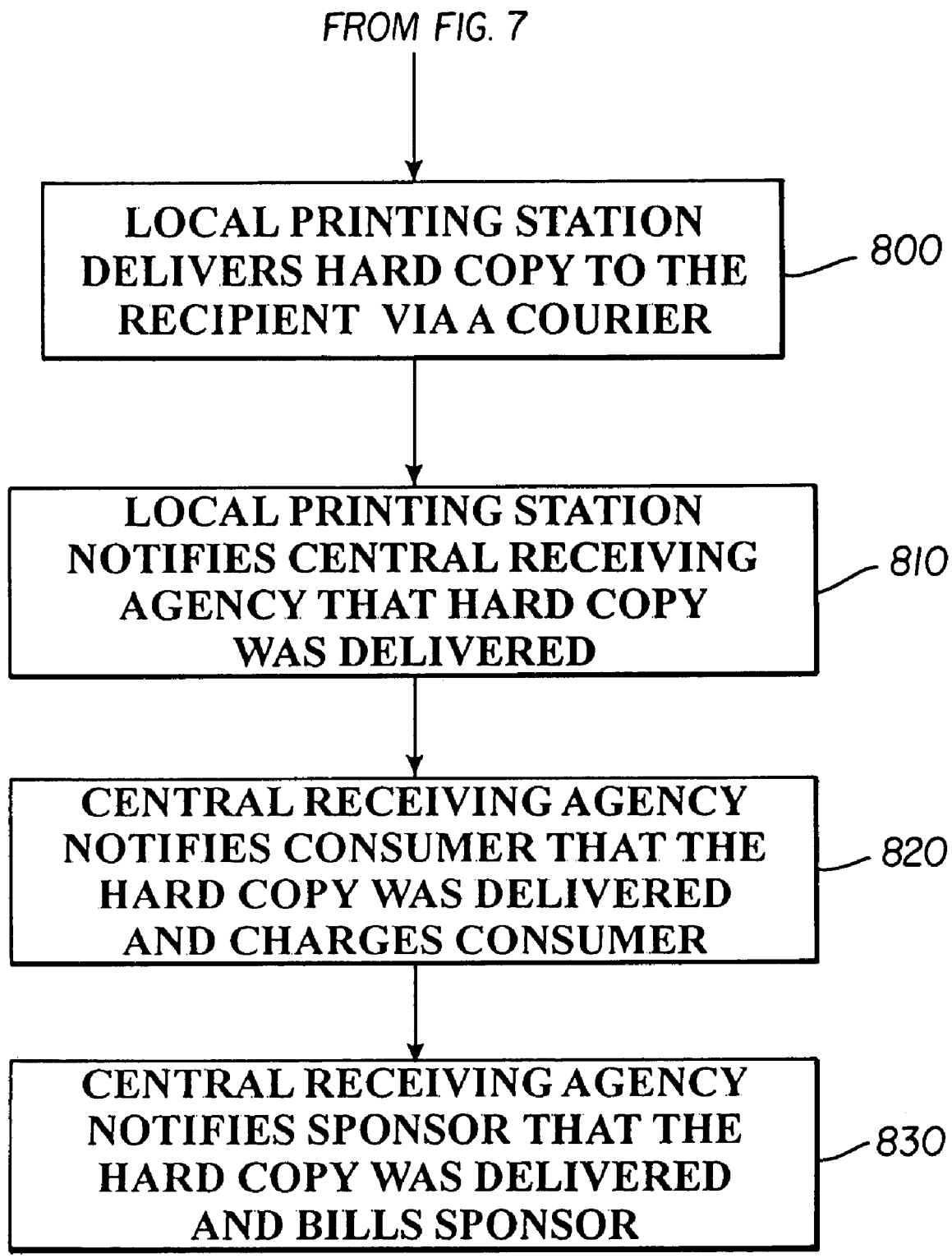
FIG. 8 is a flow chart continuing the flow chart of FIG. 7.

The local printing station 120 closest to the designated recipient receives 730 the selected image 125 and/or digital audio and/or digital video and associated text and/or graphics 129. The local printing station 120 produces 740 the hardcopy 126 and/or the digital audio and/or digital video written to CDs of the selected image 125 and associated text and/or graphics 129, and creates the package 127 to be delivered to of each of the recipients Now referring FIG. 8, which flows from FIG. 7, the packages 127 are delivered by mail or other courier 800 to the address of each of the recipients. The local printing station 120 notifies 810 the central receiving agency 80 that the package 127 was delivered. The central receiving agency 80 notifies 820 the consumer that the package 127 was delivered and charges the consumer for the printing and delivery of the package. The central receiving agency 80 notifies 830 the sponsor that the package 127 was delivered and provides charges to the sponsor for the printing and delivery of the package. The sponsor can also make payment directly via a credit card or debit card as is well known in the art.

Figure 9:
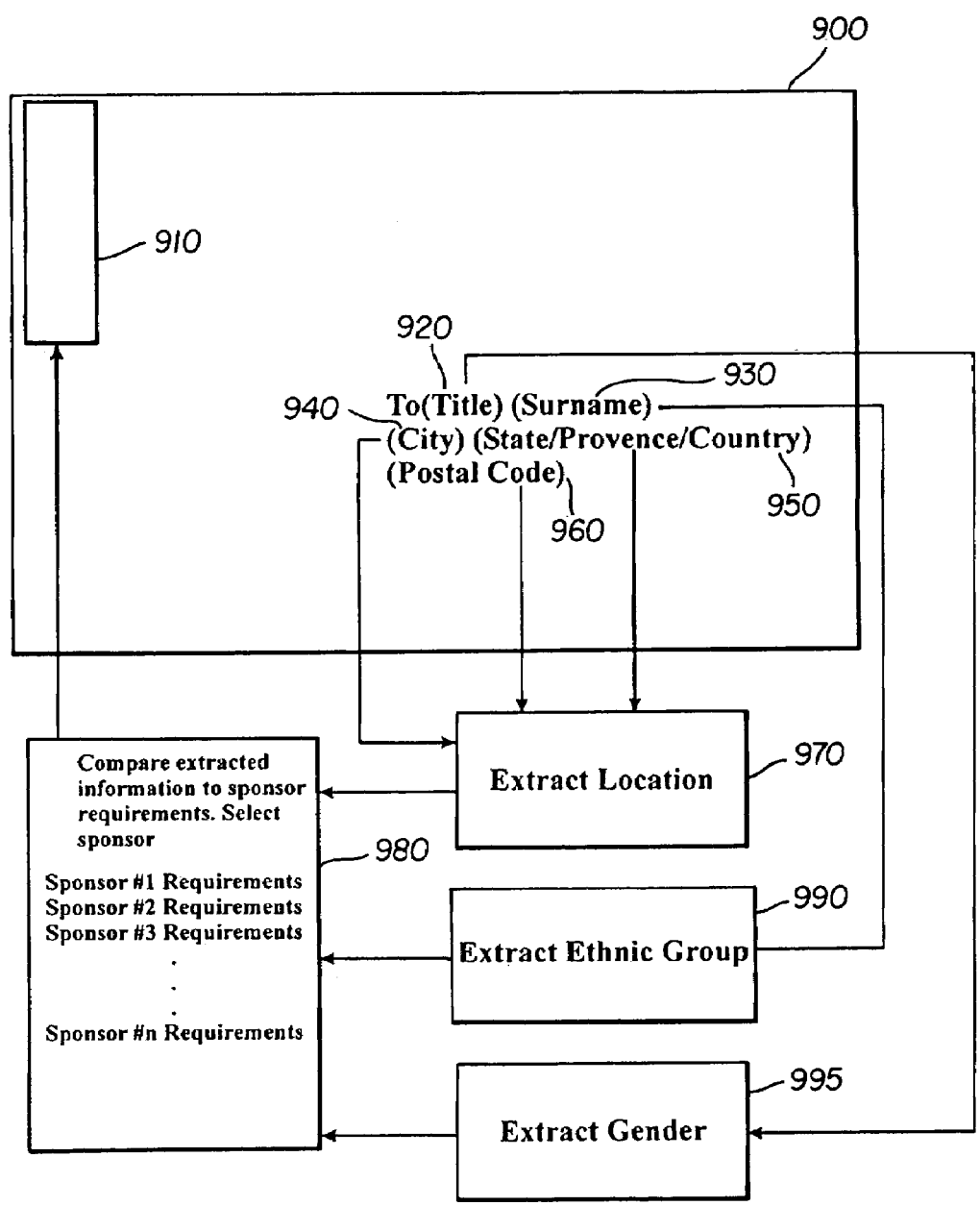
FIG. 9 is a drawing used in example 1 that shows how recipient data can be extracted from recipient address information.

FIG. 9 is a block diagram of an example of how extracted recipient information may be used to select one or more sponsors. In one example of how extracted recipient information may be used to select one or more sponsors, the gender of the recipient is extracted 995 from the recipient title 920 that will be printed on the postcard. The sponsor gender requirements are compared 980 to the extracted gender. If they match, the sponsor's image(s)/advertisement 910 is placed on the postcard 900. In another example of how extracted recipient information may be used to select one or more sponsors, the ethnic group to which the recipient belongs is extracted 990 from the recipient surname 930. The sponsor ethnic requirements are compared 980 to the extracted ethnic group. If they match, the sponsor's image (s)/advertisement 910 is placed on the postcard 900. In another example of how extracted recipient information may be used to select one or more sponsors, the location where the recipient lives is extracted 970 from the recipient city 940, recipient state/province/country 950 and recipient postal code 960. The sponsor location requirements are compared 980 to the extracted location. If they match, the sponsor's image(s)/advertisement 910 is placed on the postcard 900.

Figure 10:
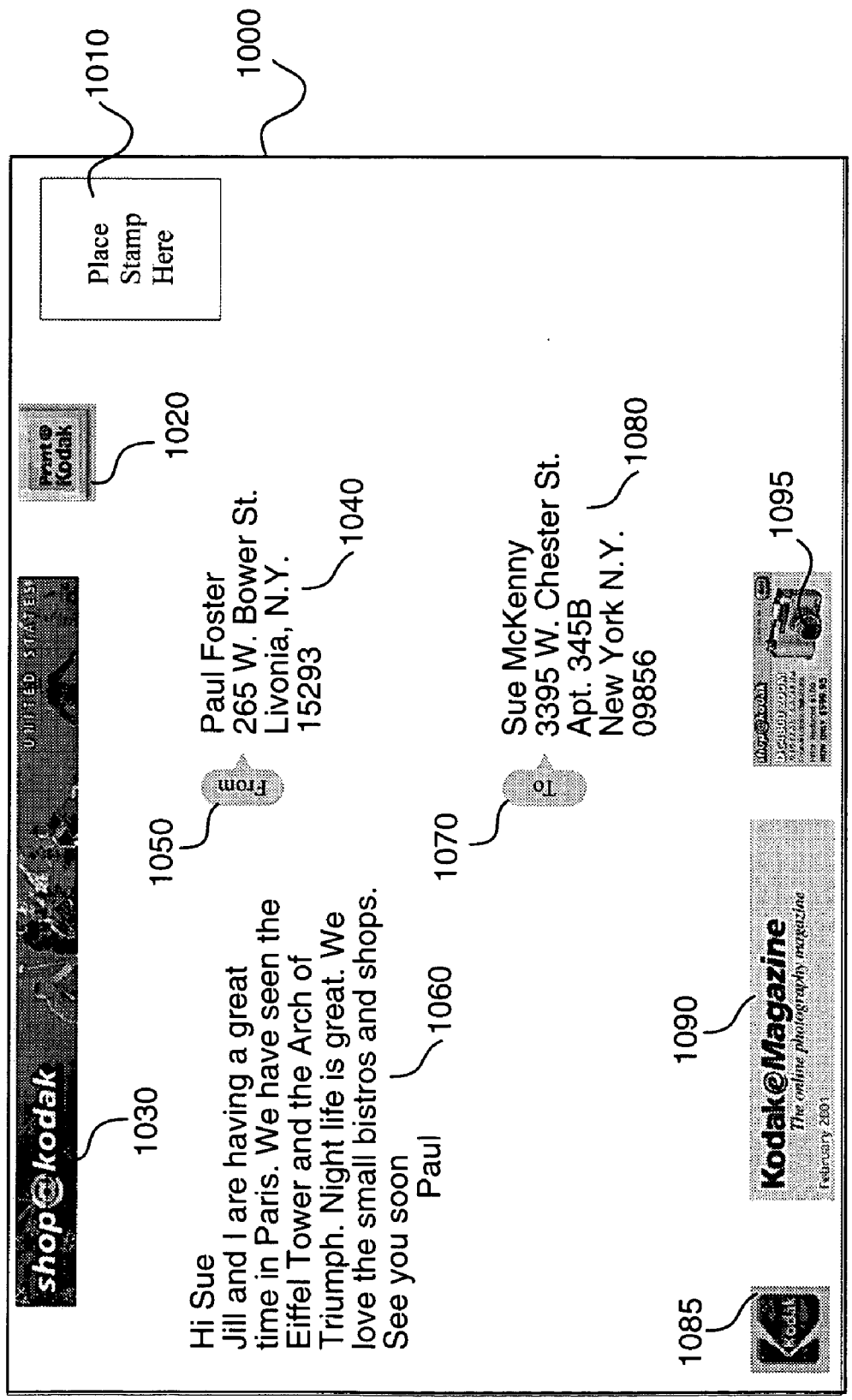
FIG. 10 is a schematic of the first half of the package made in accordance with the present invention.

FIG. 10 is a schematic of the first half of the package 127 made in accordance with the present invention. The package is a postcard that includes the postcard front 1120 described in FIG. 11 and the postcard back 1000 described in FIG. 10 that are the opposite sides of the package 127 to be delivered.

The postcard back 1000 includes the postage area 1010, the consumer address 1040, the recipient address 1080, selected consumer text 1060, selected "From" graphic 1050, selected "To" graphic 1070, sponsor #1 graphic 1020, sponsor #2 graphic 1030, sponsor#3 graphic 1090, sponsor#4 graphic 1095 and sponsor#5 graphic 1085. The number of sponsors may vary depending on consumer and recipient demographics.

Figure 11:
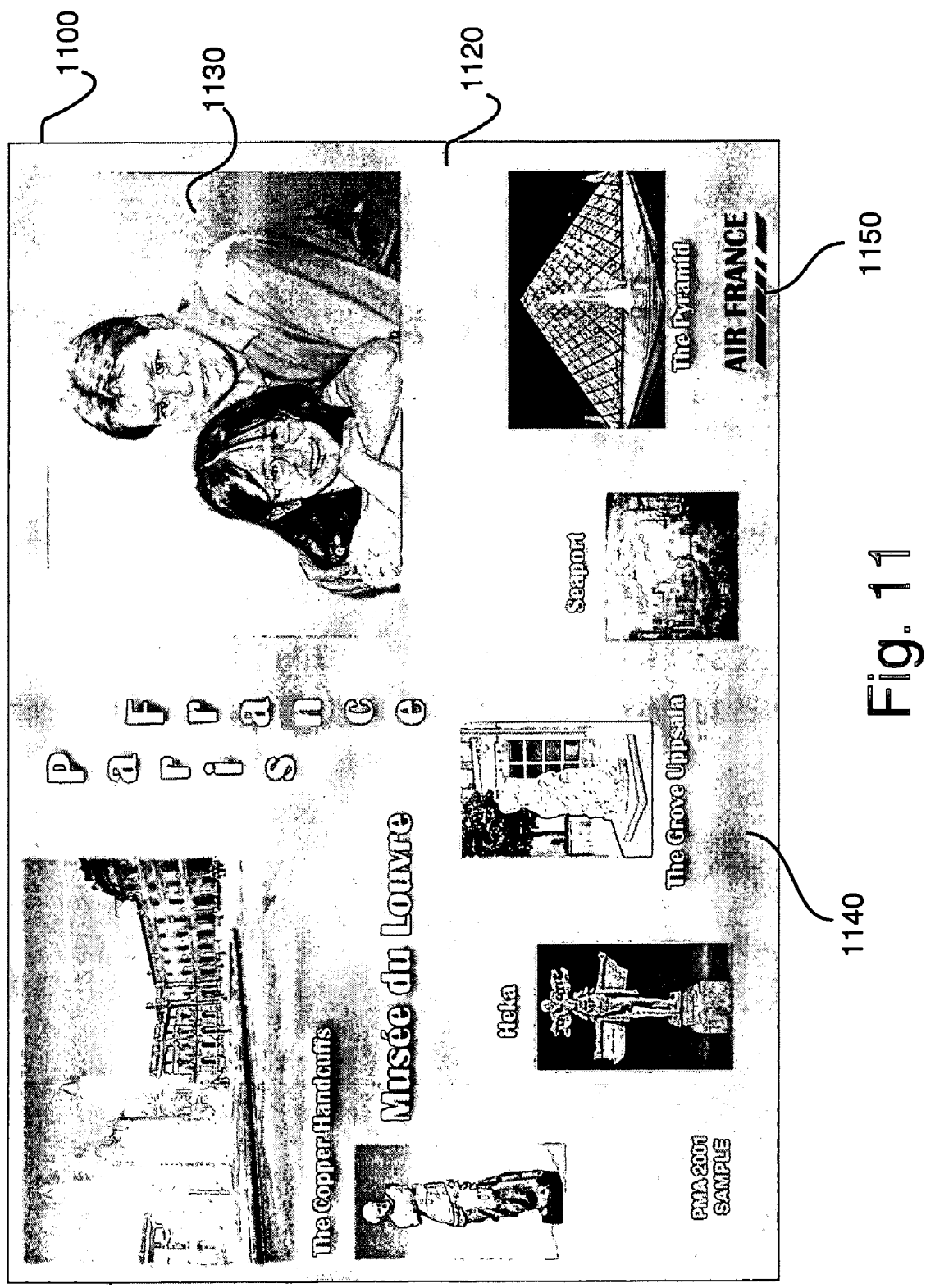
FIG. 11 is a schematic of the second half of the package made in accordance with the present invention

FIG. 11 is a schematic of the second half of the package 127 made in accordance with the present invention. The package is a postcard that includes the postcard front 1120 described in FIG. 11 and the postcard back 1000 described in FIG. 10 that are the opposite sides of the package 127 to be delivered. The postcard front 1120 includes the consumer personal picture 1110, selected consumer graphic 1140 which in this case is the postcard front background and the sponsor#6 graphic 1150. This is the package that will be delivered to the recipient.

It will be understood the present invention is not limited to the printing and delivery of images but is equally applicable to the printing and delivery of post cards, greeting cards, or the like.

The invention has been described in detail with particular reference to certain preferred embodiments thereof, but it will be understood that variations and modifications can be effected within the spirit and scope of the invention.

Parts List
10 remote location
20 personal computer
30 personal images
40 Consumer selected image(s)
45 film scanner
55 print scanner
60 monitor
70 modem
80 central receiving agency
90 communication channel
95 server
105 memory
110 monitor
115 modem
120 local printing station
125 image
126 hardcopy
127 package
129 text and/or graphics
130 thermal printer
131 minilab
140 sponsor location
145 sponsor computer
150 sponsor digital image(s)
155 film scanner
160 sponsor selected image(s)
165 print scanner
170 modem Parts List cont'd
175 monitor
200 view selected images
210 consumer selects images
220 fill out consumer order form
230 consumer information form
240 demographic information
250 consumer authorization code
300 transmission to central receiving agency
310 central receiving agency receives information
320 central receiving agency stores information
330 consumer image locator information sent
340 consumer image locator
400 information displayed
410 check consumer image
420 display sponsor image
430 select sponsor image
440 fill out sponsor information form
450 sponsor information form
460 sponsor authorization code
470 demographics requirements
500 transmit sponsor image and information
510 receipt of sponsor image
520 store sponsor image
530 sponsor image locator sent
540 sponsor image locator
550 fill out recipient address form
610 recipient address form
620 recipient address form sent Parts List cont'd
630 recipient address form received
640 extract recipient demographics
650 select sponsor(s)
660 consumer/sponsor information merging
700 determine local printing station
710 merged image transmitted to local printing station
720 authorize printing
730 local printing station receives print
740 hardcopy produced
800 package(s) delivered
810 central receiving agency notified
820 consumer notified and charged
830 sponsor notified and billed
900 postcard
910 sponsor image(s)/advertisement
920 recipient title
930 recipient surname
940 recipient city
950 recipient state/province/country
960 recipient postal code
970 extract location
980 extracted/sponsor requirements comparison
990 extract ethnic group
995 extract gender
1000 postcard back
1010 postage area
1020 sponsor#1 graphic
1030 sponsor#2 graphic Parts List cont'd
1040 consumer address
1050 selected From graphic
1060 selected consumer text
1070 selected To graphic
1080 recipient address
1090 sponsor#3 graphic
1100 sponsor#4 graphic
1110 sponsor#5 graphic
1120 postcard front
1130 consumer personal picture
1140 selected consumer graphic
1150 sponsor#6 graphic

What is claimed is:

1. A method of printing and delivering digital image(s) from a merged digital image file for one or more recipients, comprising:
   a) a consumer electronically transmitting digital image(s) and consumer information including image locator information, recipient location information and demographic information other than address information, identifying the consumer or recipient, from a consumer location remote from and over a communication channel to a central receiving agency which stores such digital image(s) and locator information in a memory, wherein the demographic information includes at least one of age, ethnicity, or income;
   b) a plurality of sponsors each electronically transmitting at least one sponsor digital image and demographic requirements identifying consumers and recipients to the central receiving agency;
   c) the consumer identifying a particular stored image in the memory using the corresponding image locator information and the recipient location information of one or more recipients,
   d) the central receiving agency selecting one or more sponsor's digital image(s) based upon a correlation between the demographic information provided by the consumer and the demographic requirements provided by the sponsor(s);

e) the central receiving agency merging into a digital image file the consumer identified digital image(s) and the corresponding selected sponsor digital image(s) selected by the central receiving agency;

f) transmitting the corresponding merged digital image file for the identified particular stored image in the memory and display such image and the merged information to the printing location of the consumer or identified recipient(s);

g) printing the merged digital image file at the printing location corresponding to consumer identified recipient(s) and delivering the printed merged image file in a package or postcard to the location corresponding to the recipient(s); and h) the sponsor making at least partial payment to the central receiving agency for the printing amid delivering the merged digital image file.

2. The method of claim 1 wherein steps (a) and (c) are preformed simultaneously.

3. The method of claim 1 wherein the recipient location information includes a distribution list originally resident in a personal computer or in a central server managed by the central receiving agency.

4. The method of claim 1 wherein the recipient location information includes the address of each of the recipients and wherein the printed image is delivered by mail to the address of each of the recipients.

5. The method of claim 1 wherein the sponsor digital image(s) includes advertising information.

6. The method of claim 1 wherein the package or postcard includes a digital audio file.

7. The method of claim 1 wherein the package or postcard includes a digital video.

8. The method of claim 1 wherein the central receiving agency provides bills or charges to the consumer and the selected sponsor(s) for the printing and delivery of the package or postcard.

* * * * *

UNITED STATES PATENT AND TRADEMARK OFFICE
CERTIFICATE OF CORRECTION

PATENT NO. : 7,191,146 B2
APPLICATION NO. : 10/032684
DATED : March 13, 2007
INVENTOR(S) : Thomas R. Wulff et al.

It is certified that error appears in the above-identified patent and that said Letters Patent is hereby corrected as shown below:

Title Page
Abstract, line 15            Delete "of" (first occurrence)

Column 10, claim 1, line 65  Delete "Recipients," and insert --recipients;--

Column 11, Claim 1, line 19  Delete "amid" and insert --and--

Signed and Sealed this

Twenty-eighth Day of August, 2007

JON W. DUDAS
*Director of the United States Patent and Trademark Office*